United States Patent
Kenjo et al.

[11] Patent Number: 6,086,231
[45] Date of Patent: Jul. 11, 2000

[54] VEHICLE LAMP

[75] Inventors: Tamotu Kenjo; Hidehiko Nagasawa; Shigeaki Kawaguti, all of Shizuoka, Japan

[73] Assignee: Koito Manufacturing Co., Ltd., Tokyo, Japan

[21] Appl. No.: 09/005,598

[22] Filed: Jan. 9, 1998

[30] Foreign Application Priority Data

Jan. 10, 1997 [JP] Japan .................................. 9-003320

[51] Int. Cl.$^7$ ...................................................... B60Q 1/04
[52] U.S. Cl. ......................... 362/507; 362/538; 362/539; 362/543; 362/544; 362/545
[58] Field of Search ................... 362/538, 539, 362/543, 544, 455, 369, 72, 459, 317, 327, 328, 326, 507, 506, 505; 313/113

[56] References Cited

U.S. PATENT DOCUMENTS

| | | | |
|---|---|---|---|
| 2,294,007 | 8/1942 | Trautner | 362/455 |
| 4,282,566 | 8/1981 | Newman | 362/369 |
| 5,047,903 | 9/1991 | Choji | 362/61 |
| 5,113,330 | 5/1992 | Makita | 362/265 |
| 5,117,335 | 5/1992 | Yamada | 362/61 |
| 5,119,276 | 6/1992 | Suzuki | 362/61 |
| 5,390,087 | 2/1995 | Daumueller et al. | 362/61 |

FOREIGN PATENT DOCUMENTS

| | | |
|---|---|---|
| 0 200 929 a2 | 11/1986 | European Pat. Off. . |
| 0 277 349 a2 | 8/1988 | European Pat. Off. . |
| 0 355 529 A2 | 2/1990 | European Pat. Off. . |
| 0 590 439 A2 | 4/1994 | European Pat. Off. . |

*Primary Examiner*—Sandra O'Shea
*Assistant Examiner*—Ismael Negron
*Attorney, Agent, or Firm*—Morgan, Lewis & Bockius LLP

[57] ABSTRACT

A vehicle lamp includes a reflector, a light source mounted on the reflector and including a light bulb positioned near a first focus of the reflector, a lens holder having a rear end side opening portion secured to a front opening portion of the reflector and a front end side opening portion, a convex lens secured to the front end side opening portion of the lens holder and positioned in front of the reflector, and a ring-like lens support surface for supporting a bottom surface of a circumferential edge portion of the convex lens formed in the front end side opening portion of the lens holder and constructed of a metal material capable of being plastically deformed, wherein a circumferential edge of the front end side opening portion of the lens holder surrounding the outer circumferential edge of the convex lens is bent radially inward to hold the circumferential edge portion of the convex lens by the lens holder, and wherein the reflector is substantially ellipsoidal.

20 Claims, 7 Drawing Sheets

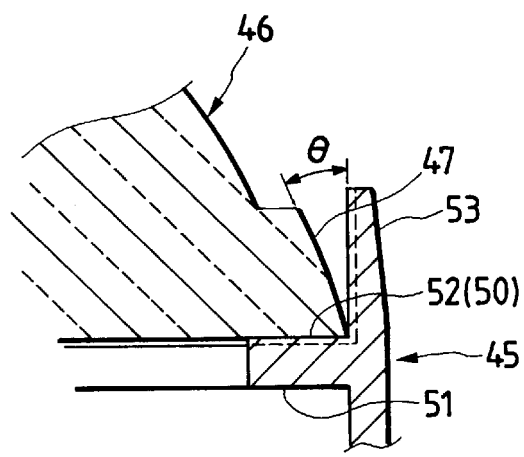
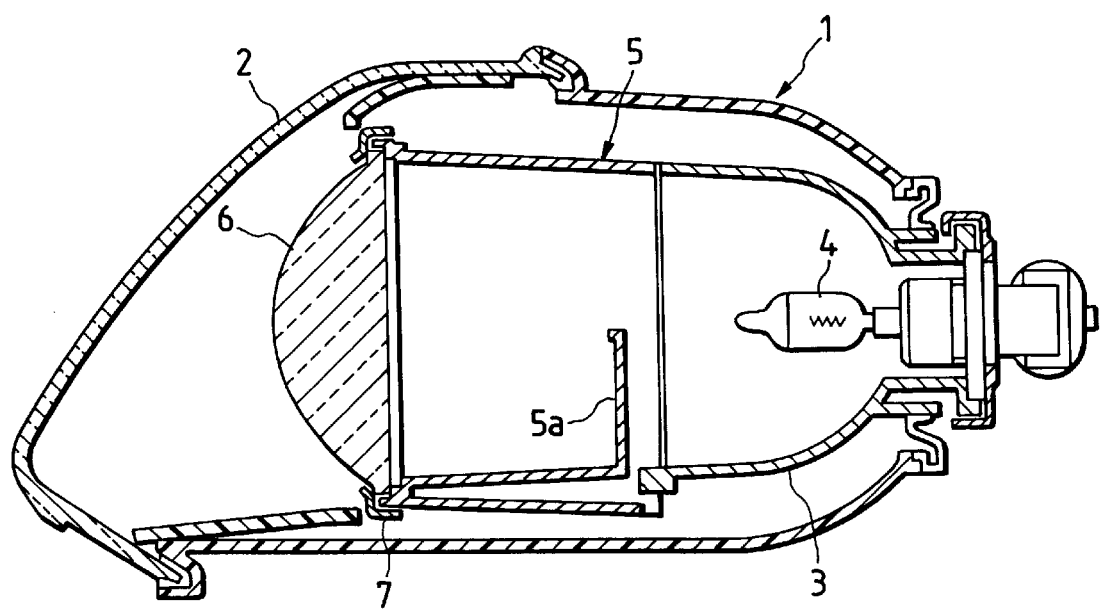

VEHICLE LAMP

This application claims the benefit of Japanese Patent Application No. Hei. 9-3320 filed Jan. 10, 1997, which is hereby incorporated by reference.

BACKGROUND OF THE INVENTION

1. Field of the Invention

The present invention relates to a vehicle projection lamp having a convex lens and an ellipsoidal reflector enclosing a light source.

2. Discussion of the Related Art

FIG. 9 shows a conventional vehicle head lamp. The vehicle head lamp includes a substantially ellipsoidal reflector 3 with a light source 4 positioned substantially at a first focal point, and a convex lens 6 (a projection convex lens) attached to a cylindrical lens holder 5 and having a focal point such that light reflected by the reflector 3 is focused. A lamp chamber is enclosed by a lamp body 1 and a front cover 2.

The convex lens 6 is secured by a front end side opening portion of the lens holder 5 with a ring-like fastening band 7. The lens holder 5 is secured to the reflector 3 with bolts and nuts (not shown). A shade 5a forms a clear cut line in passing beams of light.

The conventional projection head lamp can be small and can supply a large amount of light because the reflector 3 can be small compared to a reflection head lamp with a parabolic reflector. The conventional projection head lamp described above has been used in recent years in automotive applications.

However, because the conventional projection head lamp uses the fastening band 7 to secure the convex lens 6 to the lens holder 5, the number of parts of the projection head lamp is large, and assembling the convex lens 6 into the lens holder 5 is inconvenient.

Further, if the projection head lamp is used as a vehicle head lamp, light distribution may fluctuate because vibration acts on the vehicle head lamp, and the fastening band 7 may loosen after passage of time.

SUMMARY OF THE INVENTION

Accordingly, the present invention is directed to a vehicle lamp that substantially obviates one or more of the problems due to the limitations and disadvantages of the related art.

An object of the present invention is to provide a vehicle lamp with a small number of parts.

Another object of the present invention is to provide a vehicle lamp with a convex lens that can be easily assembled into a lens holder.

Another object of the present invention is to provide a vehicle lamp where the convex lens does not loosen inside a lens holder despite vibration and passage of time.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a vehicle lamp, including a reflector, a light source mounted on the reflector and including a light bulb positioned near a first focus of the reflector, a lens holder having a rear end side opening portion secured to a front opening portion of the reflector and a front end side opening portion, a convex lens secured to the front end side opening portion of the lens holder and positioned in front of the reflector, and a ring-like lens support surface for supporting a bottom surface of a circumferential edge portion of the convex lens formed in the front end side opening portion of the lens holder and constructed of a metal material capable of being plastically deformed, wherein a circumferential edge of the front end side opening portion of the lens holder surrounding the outer circumferential edge of the convex lens is bent radially inward to hold the circumferential edge portion of the convex lens by the lens holder, and wherein the reflector is substantially ellipsoidal.

In another aspect of the present invention there is provided a vehicle lamp, including a light bulb positioned near a focal point of a reflector, a convex lens for focusing light from the light bulb and including a flange, and a lens holder for holding the convex lens and having an opening circumferential edge portion, wherein the opening circumferential edge portion is bent radially inward to abut the flange.

In another aspect of the present invention there is provided a vehicle lamp, including an ellipsoidal reflector, a light source positioned near a focus of the ellipsoidal reflector, a convex lens positioned in front of the light source and having a circumferential flange with a taper toward a front end side of the convex lens, a lens holder for holding the convex lens and having an opening circumferential edge portion plastically deformed radially inward against the flange, three protrusions on the circumferential edge portion positioned substantially equidistant around a circumference of the circumferential edge portion, wherein the three protrusions press against the flange, a first flange portion extending from the ellipsoidal reflector and having a plurality of engagement holes, and a second flange portion extending from the lens holder and having a plurality of engagement projections mating with the plurality of engagement holes.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 8 is an enlarged view showing a taper angle of an outer surface of a flange formed on the circumference of a convex lens; and FIG. 9 is a cross-sectional view of a vehicle head lamp which is an example of a conventional projection head lamp.

DETAILED DESCRIPTION OF THE PREFERRED EMBODIMENTS

Reference will now be made in detail to the preferred embodiments of the present invention, examples of which are illustrated in the accompanying drawings.

Figure 1:
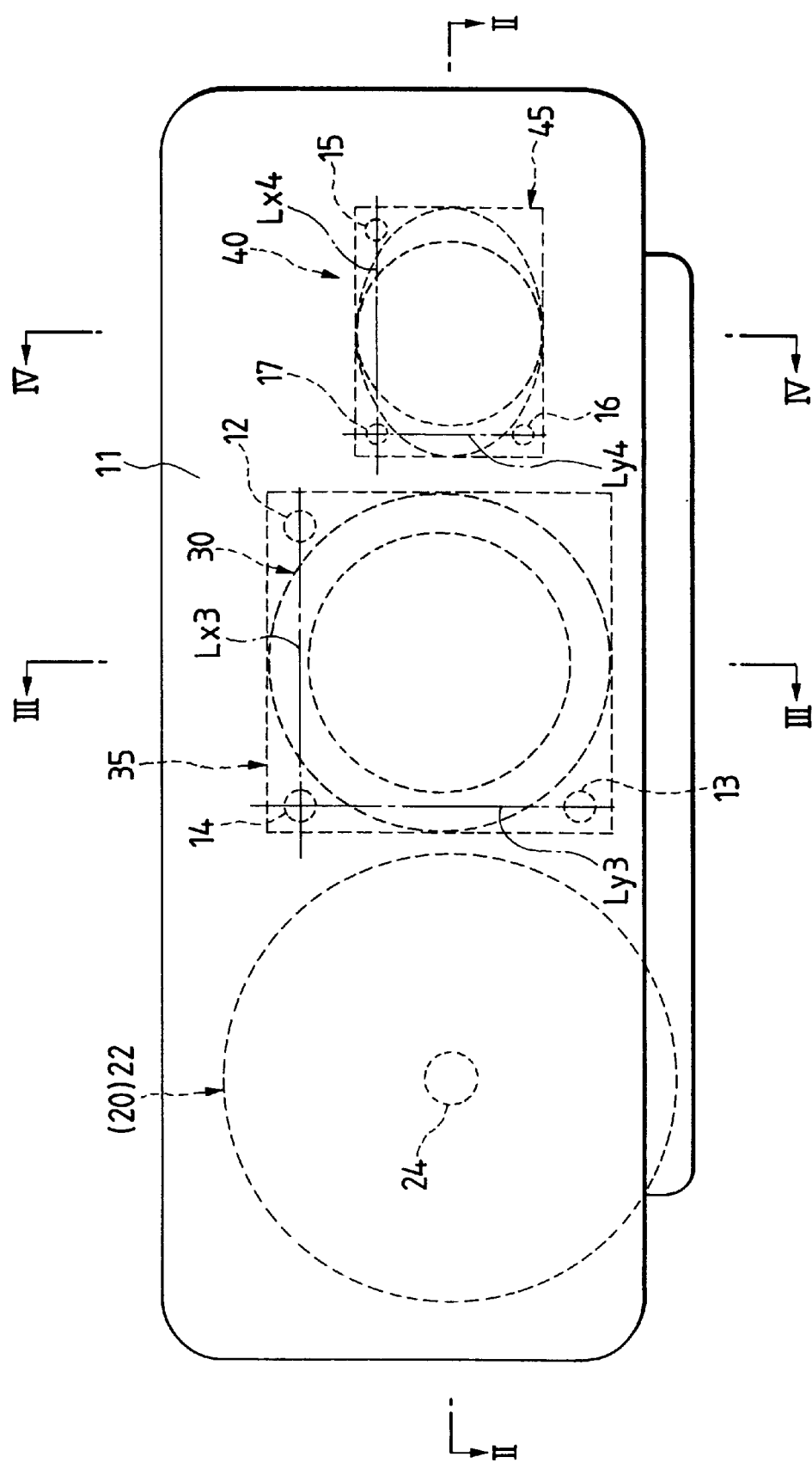
FIG. 1 is a front view of a vehicle head lamp of a preferred embodiment of the present invention.
Figure 2:
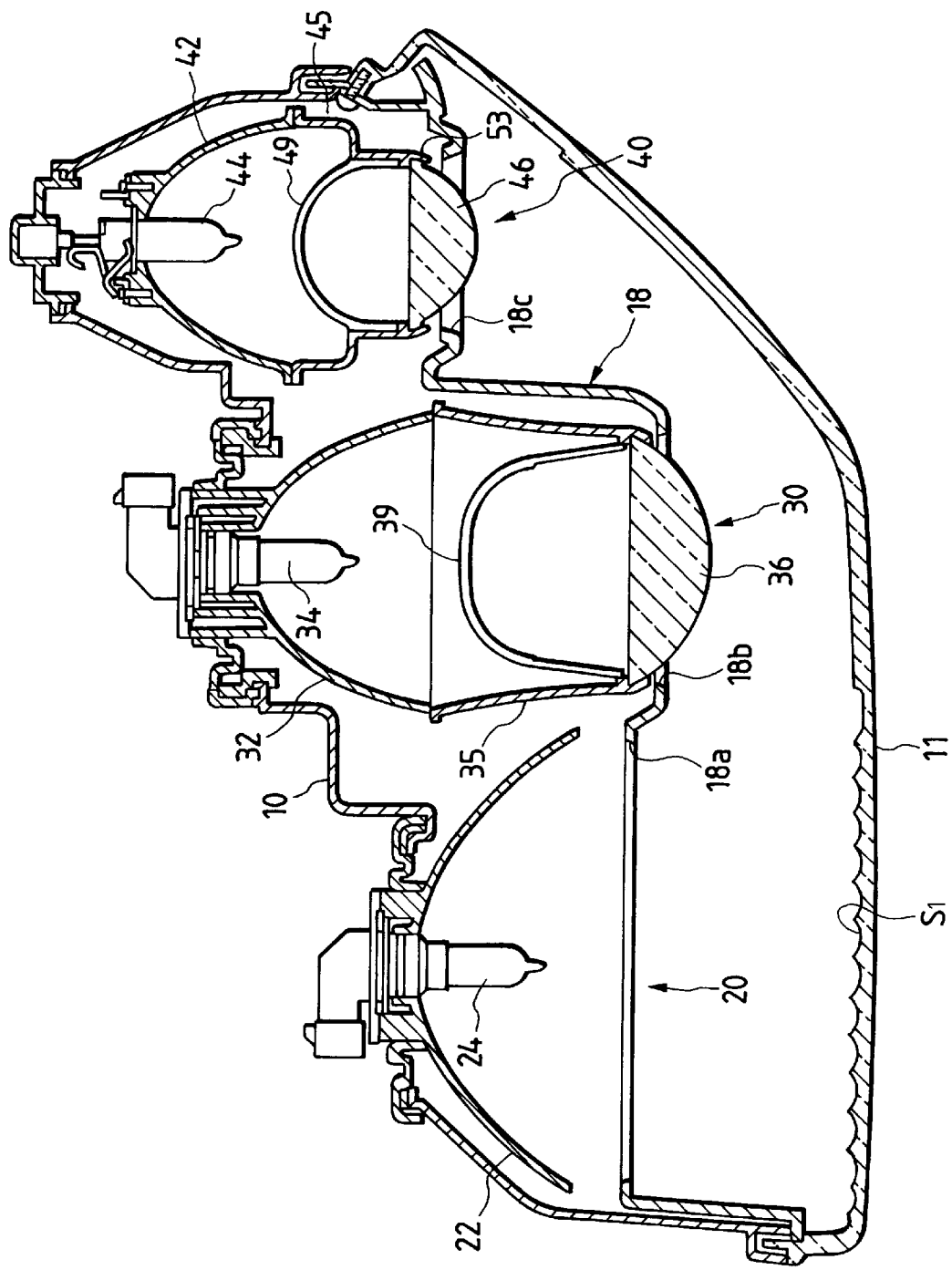
FIG. 2 is a horizontal cross-sectional view of the vehicle head lamp along line II—II in FIG. 1.

FIGS. 1 to 8 show a preferred embodiment of the present invention. As shown in FIG. 2, a vessel-like lamp body 10 opens from the front obliquely to a side. A transparent front cover 11 having a side surface that is curved backward is positioned at a front opening portion of the lamp body 10, thereby forming a lamp chamber curved front-to-side. A reflection lamp 20 forming a running beam, a projection lamp 30 forming a passing beam, and a fog lamp 40 forming a fog beam are positioned side-by-side in the lamp chamber.

The reflection lamp 20 includes a paraboloidal reflector 22, and a light bulb 24 inserted into the paraboloidal reflector 22. Light reflected by the paraboloidal reflector 22 is diffused and distributed to the right and left by a cylindrical step $S_1$ formed on the transparent front cover 11 for light distribution and control to form a light distribution pattern.

The projection lamp 30 and the fog lamp 40 include substantially ellipsoidal reflectors 32 and 42, respectively. The ellipsoidal reflectors 32 and 42 have smaller apertures than an aperture of the paraboloidal reflector 22. Light bulbs 34 and 44 are inserted into the ellipsoidal reflectors 32 and 42, respectively, and frontally circular convex lenses 36 and 46 are integrated with front opening portions of the reflectors 32 and 42 through lens holders 35 and 45, respectively. Shades 39 and 49 are integrated into the lens holders 35 and 45 and positioned at approximately afocal positions of the convex lenses 36 and 46, respectively. Light reflected by the ellipsoidal reflectors 32 and 42 towards the convex lenses 36 and 46 is partially blocked by the shades 39 and 49, respectively, to form the light distribution patterns. That is, the light distribution patterns formed by the reflection and projection lamps 20 and 30 are combined to form running beams when the reflection and projection lamps 20 and 30 are on simultaneously, while passing beams are formed when only the projection lamp 30 is on. When the fog lamp 40 is turned on, fog beams are formed.

As shown in FIG. 1, the projection lamp 30 is tiltably supported on the lamp body 10 by two aiming screws 12 and 13, which are rotatably supported to the back wall of the lamp body 10 and extending forward, and by a first ball joint 14. That is, the projection lamp 30 is tilted on a vertical axis $Ly_3$ and a horizontal axis $Lx_3$ by turning the aiming screws 12 and 13 so that an axis of the projection lamp 30 can be tilted right and left, and up and down.

The fog lamp 40 is tiltably supported on the lamp body 10 by two aiming screws 15 and 16, which are rotatably supported to the back wall of the lamp body 10 and extending forward, and a second ball joint 17. That is, the fog lamp 40 is tilted on a vertical axis $Ly_4$ and a horizontal axis $Lx_4$ by turning the aiming screws 15 and 16 so that an axis of the fog lamp 40 can be tilted right and left, and up and down.

As shown in FIG. 2, an extension reflector 18 having circular opening portions 18a, 18b and 18c, corresponding to the paraboloidal reflector 22 and the convex lenses 36 and 46, respectively, is located inside the front opening portion of the lamp body 10. The front side of the extension reflector 18 is treated by aluminum vapor deposition (i.e., subjected to specular finishing) in the same manner as the paraboloidal reflector 22. Therefore, the extension reflector 18 hides peripheral regions of the reflection, projection and fog lamps 20, 30 and 40 and makes the inside of the lamp chamber appear as a single colored mirror that is pleasing to the eye.

Figure 3:
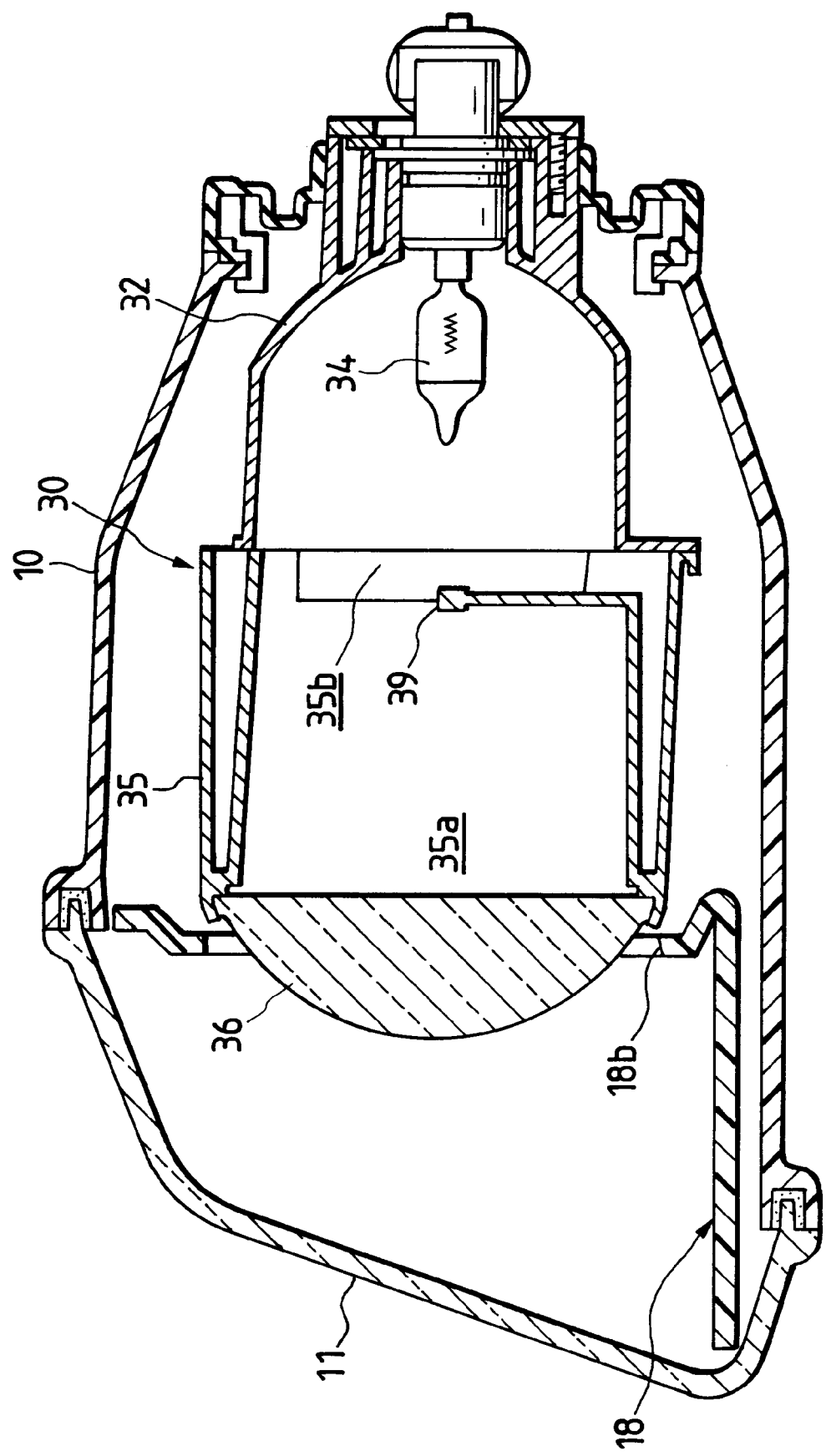
FIG. 3 is a vertical cross-sectional view of the vehicle head lamp along line III—III in FIG. 1.
Figure 4:
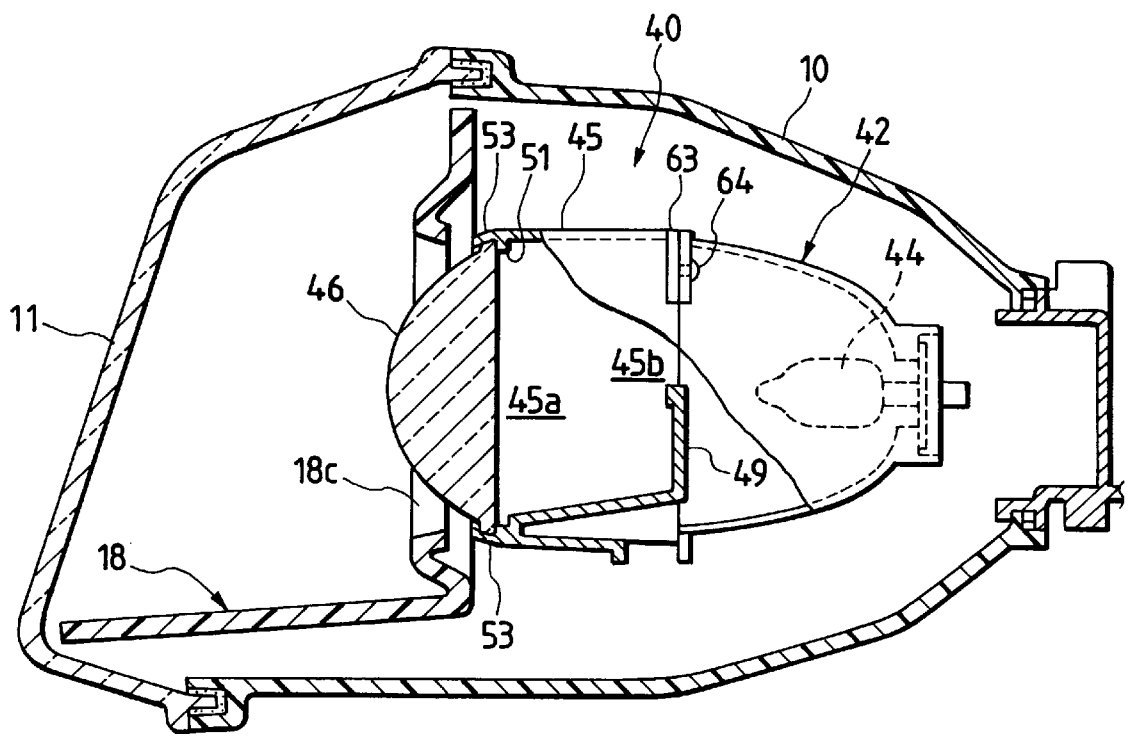
FIG. 4 is a vertical cross-sectional view of the vehicle head lamp along line IV—IV in FIG. 1.

As described above, the reflection, projection and fog lamps 20, 30 and 40 are positioned within the lamp body 10. The lens holders 35 and 45 are formed using aluminum die-casting and are capable of being bent (i.e., plastically deformed). As shown in FIGS. 3 and 4, the convex lenses 36 and 46 are secured to front end side opening portions 35a and 45a of the lens holders 35 and 45, respectively by bending an opening circumferential edge portion 53. Rear end side opening portions 35b and 45b of the lens holders 35 and 45 are also secured to the front opening portions of the reflectors 32 and 42, respectively by mating engagement holes 62 with engagement projections 64 (further described below), so that the projection and fog lamps 30 and 40 are formed integrally.

Figure 5:
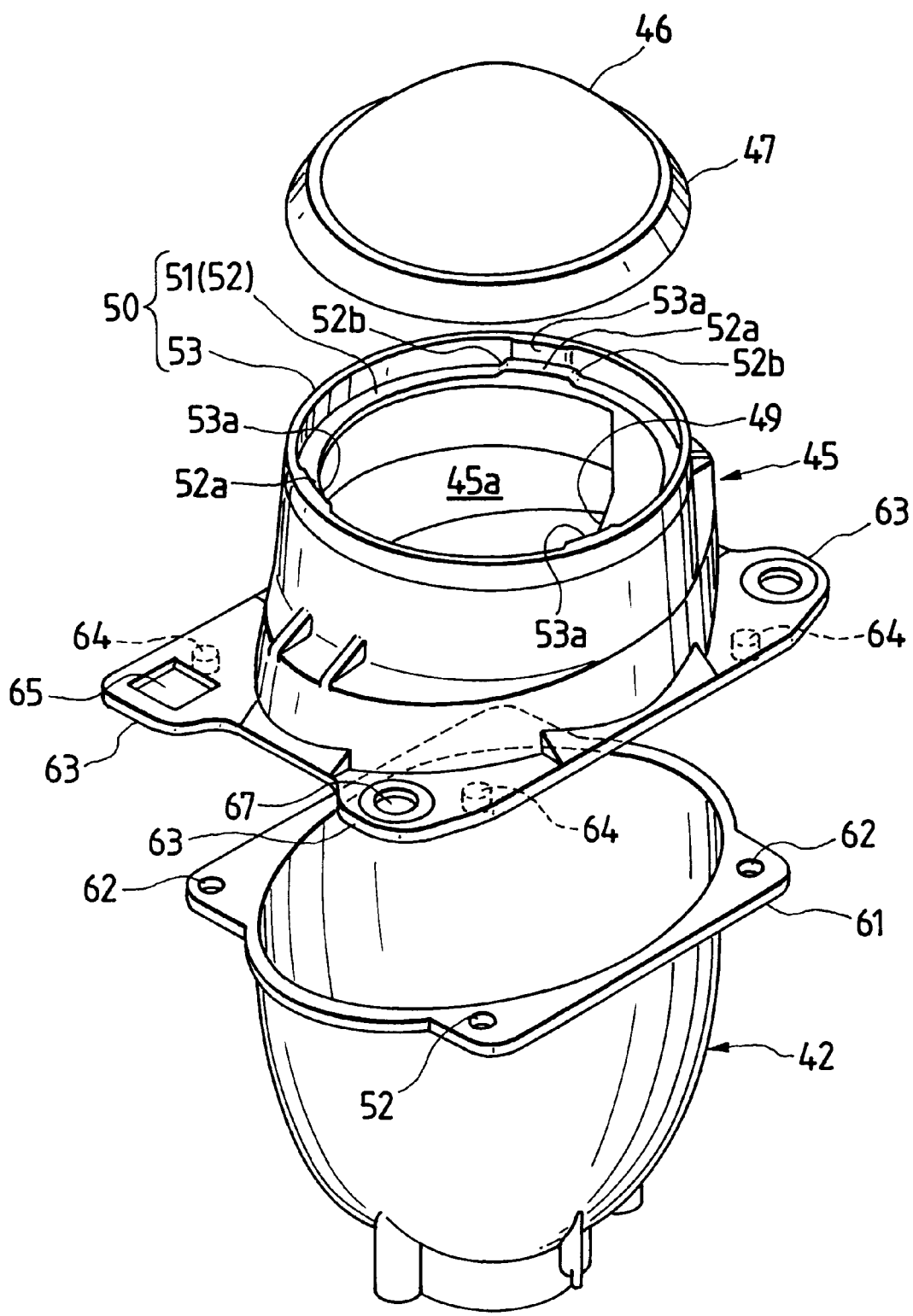
FIG. 5 is an exploded perspective view of a fog lamp of the present invention.
Figure 6:
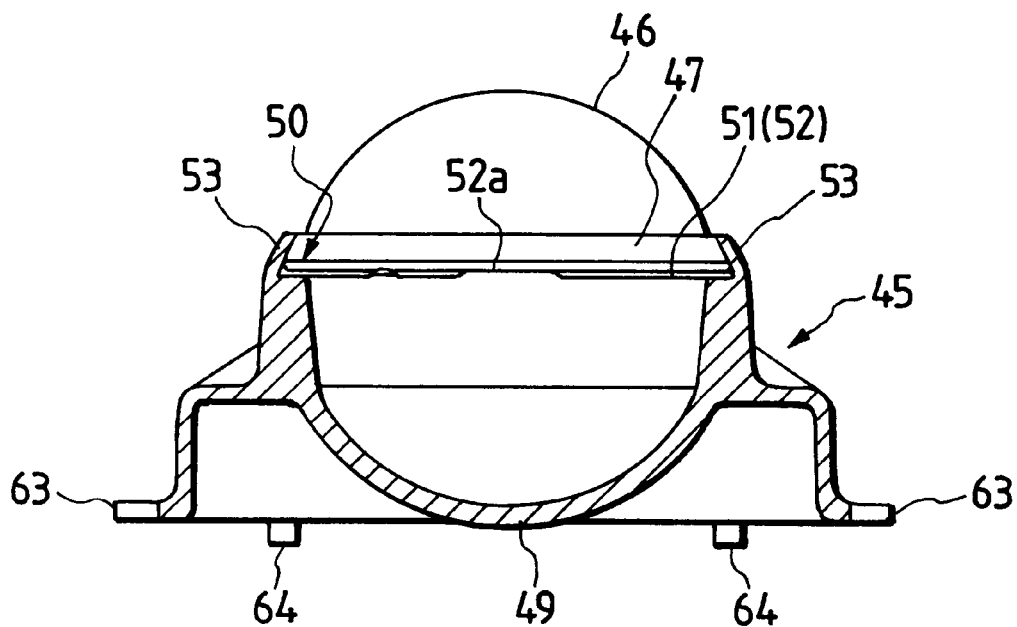
FIG. 6 is a vertical cross-sectional view of the fog lamp of the present invention.

As shown in FIGS. 4 and 5, the lens holder 45 is substantially cylindrical. A lens engagement portion 50, including a ring-like lens support surface 52 having an inner flange 51, is circumferentially provided in the front end side opening portion 45a of the lens holder 45 for supporting the bottom surface of the lens 46. An opening circumferential edge portion 53 for surrounding the lens support surface 52 is formed in the front end side opening portion 45a of the lens holder 45.

Figure 7:
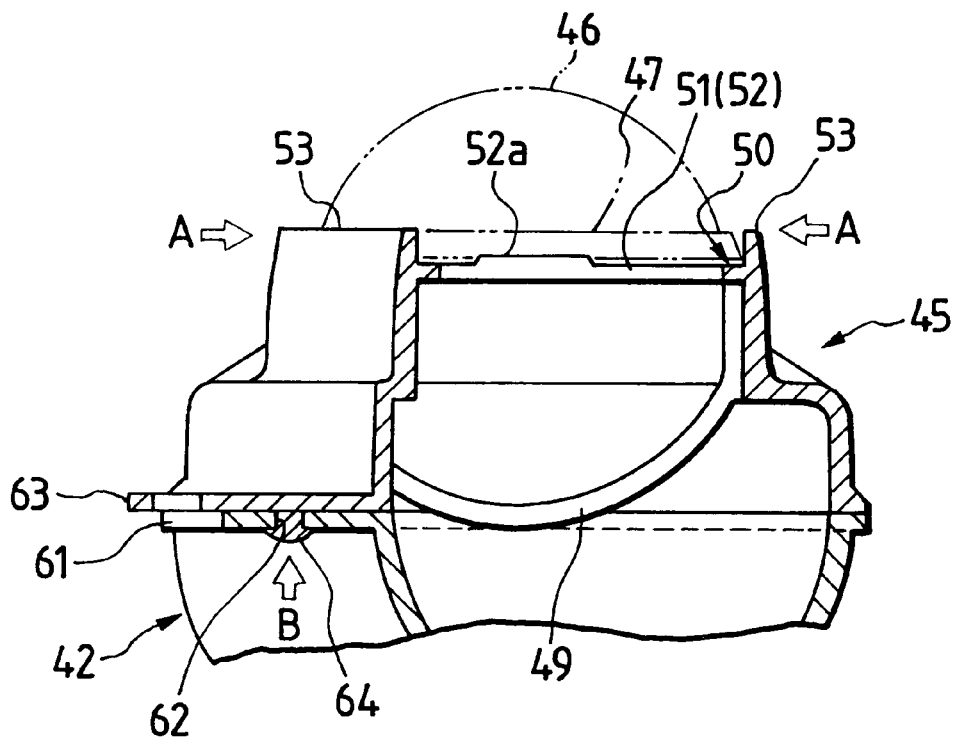
FIG. 7 is a cross-sectional view showing a lens holder and a reflector of the fog lamp of the present invention, and also showing a joint portion between the lens holder and the reflector.

A flange 47 corresponding to the ring-like lens support surface 52 is formed in the circumferential edge portion of the convex lens 46, as shown in FIGS. 7 and 8. When the opening circumferential edge portion 53 is bent (i.e., plastically deformed) radially inward (i.e., in a direction of arrow A in FIG. 7) when the convex lens 46 engages the lens engagement portion 50 (i.e., when the flange 47 engages the lens support surface 52), the flange 47 is securely held by the lens engagement portion 50. Thus, the convex lens 46 is integrally secured to the lens holder 45.

Three protrusions 52a are located at three substantially circumferentially equidistant locations on the ring-like lens support surface 52. Because the three protrusions 52a abut a bottom surface of the flange 47, the convex lens 46 is securely held by the bottom surface of the lens engagement portion 50 without any slack. Each of step portions 52b between the lens support surface 52 and the three protrusions 52a is formed in a shape of a curved surface so that each of the step portions 52b is inconspicuous through the lens 46.

As shown in FIG. 5, three protrusions 53a are formed at locations corresponding to the three protrusions 52a on the circumferential surface of the opening circumferential edge portion 53. When the opening circumferential edge portion 53 is bent inward, the flange 47 is grasped by the three protrusions 53a inside the opening circumferential edge portion 53 so that the convex lens 46 is held firmly in the lens engagement portion 50.

Further, as shown in an enlarged view in FIG. 8, the outer surface of the front side opening circumferential edge portion 53 has a taper whose external diameter is reduced toward the front end side. The thickness of the opening circumferential edge portion 53 is reduced toward a front end side of the vehicle lamp so that the opening circumferential edge portion 53 can be bent with only a small amount of force.

Further, because the flange 47 corresponding to the ring-like lens support surface 52 is formed in the opening circumferential edge portion 53 of the convex lens 46, the area of the ring-like lens support surface 52 can be large without reducing an effective aperture of the convex lens 46. Accordingly, the projection lens 46 can be effectively secured after the bending of the opening circumferential portion 53.

Further, as shown in FIG. 8, the outer surface of the flange 47 is formed with the taper having its external diameter reduced toward the front end side of the convex lens 46 (i.e. having a taper angle θ of between 5 and 30 degrees). The bending of the opening circumferential portion 53 can therefore be performed smoothly without cracking the flange 47, and the flange 47 cannot drop out of the opening circumferential portion 53.

Further, as shown in FIGS. 4 and 5, a first flange portion 61 having the engagement holes 62 is formed in the circumferential edge of the front opening portion of the ellipsoidal reflector 42. A second flange portion 63 extending left and right and opposite the first flange portion 61 on the reflector side is formed in the circumferential edge of the rear end side opening portion 45b of the lens holder 45. The engagement protrusions 64 are located on the joint surface of the second flange portion 63, so that the engagement protrusions 64 can engage (mate with) the engagement holes 62. When the engagement protrusions 64 engage the engagement holes 62, the ellipsoidal reflector 42, the lens holder 45 and the convex lens 46 are thus held securely in place.

When the front end portions of the engagement protrusions 64 passing through the engagement holes 62 so as to project from the engagement holes 62 are squashed (bent) toward the engagement holes 62 in a direction of arrow B in FIG. 7, the lens holder 45, the reflector 42 and the convex lens 46 are integrally secured to each other.

As shown in FIG. 5, a first hole 65 in the second flange portion 63 is used for mounting a ball portion of the ball joint 17 (shown in FIG. 1). Second holes 67 are formed in the second flange portion 63 for mounting nuts to be thread-engaged with the aiming screws 16 (shown in FIG. 2).

The structure for securing the convex lens 36 in the lens holder 35 and for securing the lens holder 35 and the ellipsoidal reflector 32 to each other is the same as a structure for securing the convex lens 46 in the lens holder 45 and for securing the lens holder 45 and the ellipsoidal reflector 42 to each other in the fog lamp 40. Accordingly, additional description thereof will be omitted.

Although the preferred embodiment has been described with reference to a vehicle lamp, the present invention may be applied to a foot lighting projector generally, and any number of other applications.

In the vehicle lamp of the present invention, because the lens support surface 52 and the opening circumferential edge portion 53 in the front end side opening portion 45a of the lens holder 45 function as fasteners, no fastening bands are necessary. Accordingly, the number of parts of the vehicle lamp is reduced, simplifying its structure. Further, because the convex lens 46 can be securely held in the lens holder 45 by a simple operation of bending the opening circumferential edge portion 53 of the lens holder 45, assembling the convex lens 46 into the lens holder 45 is easy.

The opening circumferential edge portion 53 is stiff after bending, and therefore there is no risk of loosening between the opening circumferential edge portion 53 and the convex lens 46. Long-term stability of light distribution is thus assured.

Further, because the lens holder 45 and the ellipsoidal reflector 42 can be secured to each other by a simple operation of bending ends of the engagement protrusions 64, it is easy to assemble the ellipsoidal reflector 42 into the lens holder 45. Further, because the opening circumferential edge portion 53 is stiff after bending, there is no risk of loosening in the joint portion between the lens holder 45 and the ellipsoidal reflector 42; long-term stability of light distribution is again assured.

The circumferential edge of the front end side opening portion 45a of the lens holder 45 functions as a lens fastening element. Accordingly, the fastening band required in a conventional projection head lamp becomes unnecessary, so that the number of constituent parts of the vehicle lamp can be reduced. Further, the convex lens 46 can be secured in the lens holder 45 by a simple operation of bending the opening circumferential edge portion 53. Accordingly, it is easy to assemble the convex lens 46 into the lens holder 45.

Further, because the opening circumferential edge portion 53 is plastically deformed radially inward to secure the convex lens 46 in the lens holder 45 and has good stiffness, looseness never occurs between the lens holder 45 and the convex lens 46 even if vibration acts on the vehicle lamp for a long time.

The flange 47 formed in the circumferential edge portion 53 of the convex lens 46 is designed so that the area of the ring-like lens support surface 52 can be large without reduction of the effective aperture of the convex lens 46. Accordingly, the convex lens 46 can be effectively secured in the lens holder 46.

If the taper angle is smaller than 5 degrees, the stopper function of the opening circumferential edge portion 53 does not work well. If the taper angle is larger than 30 degrees, the thickness of the circumferential edge of the flange 47 is reduced so that breaks or cracks occur in the flange 47 at the time of bending. Accordingly, the taper angle of the flange 47 is in a range between 5 degrees and 30 degrees so that both smooth bending of the opening circumferential edge portion 53 and secure convex lens 46 attachment results.

As shown in FIG. 4, positioning of the convex lens 46 is easy compared to structure where a ring-like lens support surface 52 entirely abuts a lens.

Moreover, because the thickness of the circumferential edge of the front end side opening portion 45a of the lens holder 45 is reduced toward the front end side and because the outer circumferential surface of the opening portion has a taper, the circumferential edge of the front end side opening portion 45a of the lens holder 45 can be easily plastically deformed radially inward.

The lens holder side engagement protrusions 64 and the reflector side engagement holes 62 function to position both the lens holder 45 and the ellipsoidal reflector 42, and to secure both together. Thus, no bolts and nuts are required, and the number of parts can be reduced. Further, because the lens holder 45 and the ellipsoidal reflector 42 can be secured to each other by a simple operation of bending ends of the engagement protrusions 64, it is easy to assemble the ellipsoidal reflector 42 into the lens holder 45.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A vehicle lamp comprising:

a reflector;

a light source mounted on the reflector and including a light bulb positioned near a first focus of the reflector;

a plastically deformable lens holder having a rear end side opening portion secured to a front opening portion of the reflector and a front end side opening portion;

a lens secured to the front end side opening portion of the plastically deformable lens holder, positioned in front of the reflector and having a convex surface;

a lens support surface projecting radially inward from an inner surface of the plastically deformable lens holder, for supporting a bottom surface of a circumferential edge portion of the lens and formed in the front side opening portion of the plastically deformable lens holder, wherein a circumferential edge of the front end side opening portion of the plastically deformable lens holder surrounding the outer circumferential edge of the lens is bent radially inward to hold the circumferential edge portion of the lens, and wherein the plastically deformable lens holder and the lens support surface are formed of a single piece.

2. The vehicle lamp of claim 1, further including protrusions formed at three substantially circumferentially equidistant locations on the ring-like lens support surface and abutting a bottom surface of the circumferential edge portion of the convex lens.

3. The vehicle lamp of claim 1, wherein the outer circumferential surface of the front end side opening portion of the lens holder includes a taper having an external diameter reduced toward a front end side of the convex lens; and wherein a thickness of the circumferential edge of the front end side opening portion of the lens holder is smaller toward the front end side of the convex lens.

4. The vehicle lamp of claim 1, further including:

a lens holder side flange portion and a reflector side flange portion having joint surfaces opposite each other in a direction of a light axis and formed in joint portions of the lens holder and the reflector respectively; and engagement protrusions on the joint surface of the lens holder side flange portion passing through engagement holes provided in the joint surface of the reflector side flange portion, wherein ends of the engagement protrusions are bent to secure the lens holder and the reflector.

5. The vehicle lamp of claim 1, wherein the lens support surface has a generally circular shape.

6. The vehicle lamp of claim 1, wherein the lens support surface projects radially inward from the inner surface of the plastically deformable lens holder along the entire circumference of the plastically deformable lens holder.

7. The vehicle lamp of claim 1, wherein the reflector is substantially ellipsoidal.

8. The vehicle lamp of claim 1, further including a flange formed in the circumferential edge portion of the lens and corresponding to the lens support surface, wherein an outer surface of the flange is formed with a taper having an external diameter reduced toward a front end side of the lens.

9. The vehicle lamp of claim 8, wherein a taper angle of the outer surface of the flange is between 5 degrees and 30 degrees.

10. A vehicle lamp comprising:

a light bulb positioned near a focal point of a reflector;

a lens for focusing light from the light bulb, the lens including a flange and having a convex surface; and a plastically deformable lens holder for holding the lens and having an opening circumferential edge portion, wherein the opening circumferential edge portion is bent radially inward toward the flange, wherein the plastically deformable lens holder includes a ledge projecting radially inward from an inner surface of the plastically deformable lens holder and abutting a bottom surface of the lens, and wherein the plastically deformable lens holder and the ledge are formed of a single piece.

11. The vehicle lamp of claim 10, wherein the opening circumferential edge portion is plastically deformable.

12. The vehicle lamp of claim 10, further including a shade positioned between the light bulb and the lens.

13. The vehicle lamp of claim 10, wherein the reflector is ellipsoidal.

14. The vehicle lamp of claim 10, further including:

a first flange portion formed on a front edge portion of the reflector and having a plurality of engagement holes; and a second flange portion formed on a rear end portion of the plastically deformable lens holder and having a plurality of engagement protrusions corresponding to the plurality of engagement holes, wherein the plastically deformable lens holder is secured to the reflector by mating the plurality of engagement protrusions with the plurality of engagement holes.

15. The vehicle lamp of claim 10, further including:

a lamp body and a lamp cover enclosing the light bulb, the reflector, the plastically deformable lens holder and the lens;

a second flange portion in the plastically deformable lens holder and having a hole for positioning a ball joint; and first and second aiming screws rotatably attached to a back wall of the lamp body, wherein an axis of the vehicle lamp can be adjusted by the first and second aiming screws in conjunction with the ball joint.

16. The vehicle lamp of claim 10, wherein an outer surface of the flange has a taper toward a front end side of the convex lens.

17. The vehicle lamp of claim 16, wherein the reflector is substantially ellipsoidal.

18. The vehicle lamp of claim 16, further including:

a first flange portion formed on a front end portion of the reflector and having a plurality of engagement holes; and a second flange portion formed on a rear end portion of the lens holder and having a plurality of engagement protrusions corresponding to the plurality of engagement holes, wherein the lens holder is secured to the reflector by mating the plurality of engagement protrusions with the plurality of engagement holes.

19. The vehicle lamp of claim 16, further including:

a lamp body and a lamp cover enclosing the light bulb, the reflector, the lens holder and the lens;

a second flange portion in the lens holder and having a hole for positioning a ball joint; and first and second aiming screws rotatably attached to a back wall of the lamp body, wherein an axis of the vehicle lamp can be adjusted by the first and second aiming screws in conjunction with the ball joint.

20. A vehicle lamp, comprising:

an ellipsoidal reflector;

a light source positioned near a focus of the ellipsoidal reflector;

a convex lens positioned in front of the light source and having a circumferential flange with a taper toward a front end side of the convex lens;

a lens holder for holding the convex lens and having an opening circumferential edge portion plastically deformed radially inward against the flange;

three protrusions on the circumferential edge portion positioned substantially equidistant around a circumference of the circumferential edge portion, wherein the three protrusions press against the flange;

a first flange portion extending from the ellipsoidal reflector and having a plurality of engagement holes; and a second flange portion extending from the lens holder and having a plurality of engagement projections mating with the plurality of engagement holes.

* * * * *